United States Patent [19]

Meynet

[11] Patent Number: 4,514,089
[45] Date of Patent: Apr. 30, 1985

[54] APPARATUS TO PROCESS PIZZA DOUGH

[76] Inventor: Armando E. Meynet, 674 Keil St., Elmont, N.Y. 11003

[21] Appl. No.: 634,457

[22] Filed: Jul. 26, 1984

[51] Int. Cl.³ .......................... B28C 1/16; A21C 1/00
[52] U.S. Cl. ................................. 366/69; 425/324.1; 425/200
[58] Field of Search .................. 366/69, 70, 71, 72, 366/78, 92, 348, 349, 219, 232, 237, 238; 99/485; 425/324.1, 200

[56] References Cited

U.S. PATENT DOCUMENTS

| | | | |
|---|---|---|---|
| 519,740 | 5/1894 | Shaffer | 366/69 |
| 1,952,672 | 3/1934 | Hilt | 366/69 |
| 3,547,053 | 12/1970 | Mueller | 366/69 |

Primary Examiner—Robert W. Jenkins
Attorney, Agent, or Firm—McAulay, Fields, Fisher, Goldstein & Nissen

[57] ABSTRACT

This disclosure is directed to an apparatus to process pizza dough. The apparatus includes a platform to support the dough to be processed, and further includes a platen having finger-like projections positioned to operatively come in contact with the dough. The platform and platen are caused to oscillate relative to one another along an axis perpendicular to the dough support surface, and also move rotationally relative to one another in a plane parallel to the dough support surface. The motion of the platform and platen is in a predetermined timed relationship to cause the projections to engage and process the dough.

10 Claims, 7 Drawing Figures

APPARATUS TO PROCESS PIZZA DOUGH

BACKGROUND OF THE INVENTION

This invention is directed to an apparatus to process pizza dough, and more particularly, to an apparatus that relaxes, flattens, and spreads the dough to a state where it is ready to receive thereon cheese, sauce and other food ingredients.

Heretofore, it is known to process pizza dough by hand. A predetermined amount of dough is flattened by pounding, rolling, and stretching, or the like, to the desired shape and thickness. The steps are done entirely by hand in which the elastic dough is shaped to fit the baking pan by skilled fingers which relax the dough. The perimeter or marginal edge is turned upwardly to form a lip, and the processed dough is now ready to receive thereon the pizza making ingredients, such as, cheese, sauce, oil, etc. Thereafter, the processed dough, with the ingredients thereon, is placed in a temperature controlled oven for baking to become a pizza pie ready to eat.

The aforesaid process is well known to most every one who has visited a pizza parlor. The steps taken to prepare or process the dough often attract customers and people passing by who view the process performed by skilled hands as an eye catching show. However, the effort required on the part of the chef takes considerable time and skill.

The present invention provides a novel apparatus which overcomes many of the disadvantages associated with the heretofore known processing of pizza dough by hand, as hereinafter described.

SUMMARY

The apparatus of this invention comprises a platform which supports the dough to be processed. The apparatus further includes a platen in the form of at least one bar spaced from the platform. A plurality of spaced apart finger-like projections project from the bar and are positioned to operatively come in contact with the dough.

The platform and platen are movable relative to one another. In this regard, a first motive means is provided to cause the platform and the platen to oscillate relative to one another along an axis perpendicular to the dough support surface. A second motive means is provided to cause the platform and the platen to also move relative to one another in a plane parallel to the dough support surface. The first and second motive means are coupled to operate in a predetermined timed relationship to one another whereby the projections engage and process the dough.

In another embodiment of the invention, third motive means are provided to cause the platform and the platen to further move relative to one another in an arcuate path to the dough support surface, and to cause the projections to engage the dough in a sequential manner.

For a better understanding of the invention, and its various features and advantages, reference should be made to the following detailed description when taken in conjunction with the accompanying drawings.

DESCRIPTION OF THE PREFERRED EMBODIMENT

Figure 1:
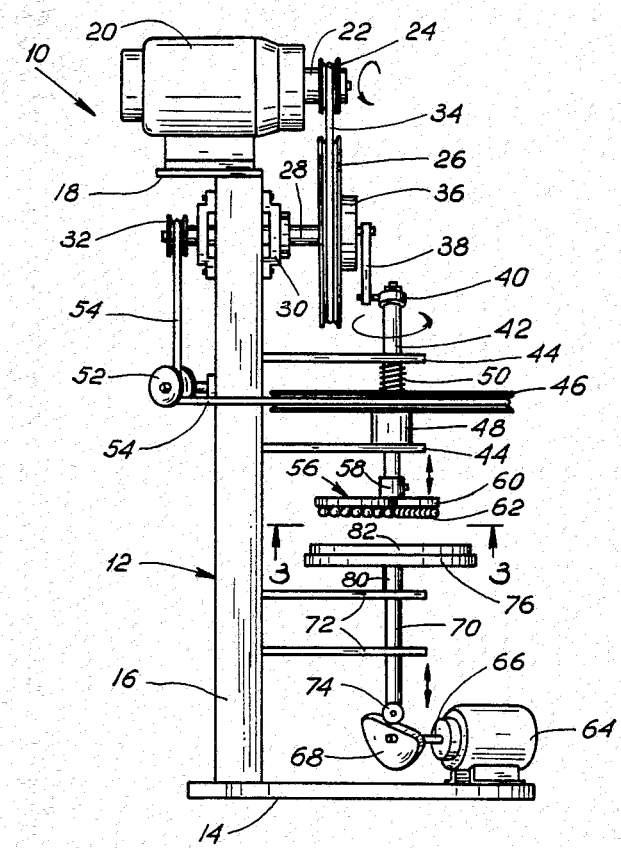
FIG. 1 is a side elevational view of an apparatus to process pizza dough embodying the present invention.

Referring to the drawings, and more particularly to FIG. 1, there is shown an apparatus 10 to process pizza dough in accordance with the present invention. Although the words pizza dough are used throughout this specification, it will be appreciated that the apparatus functions equally as well to process dough for other purposes, such as for making bread, or the like.

Apparatus 10 includes a stand 12 having a base 14 and an upright column 16. A plate 18 is connected to the top of column 16, and a motor 20 is mounted to the plate. Motor 20 drives a shaft 22 to which is connected a pulley 24 for rotation therewith.

Also supported by column 16, and spaced below motor 20, is a second larger pulley 26 which is in vertical alignment to pulley 24. Pulley 26 is fixedly connected to one end of a shaft 28 which, in turn, is journalled in a bearing structure 30 connected to column 16. The opposite end of shaft 28 supports another smaller pulley 32 for rotation therewith. A belt 34 serves to connect pulleys 24 and 26. The operation is such that rotation of shaft 22 by the energizing of motor 20 causes pulley 24 to rotate which, in turn, causes rotation of pulleys 26 and 32 by means of interconnecting belt 34 in conventional manner. Fixedly connected to either pulley 26 or shaft 28 is a disc 36 for rotation therewith. A link 38 has one end eccentrically mounted to disc 36. The opposite end of link 38 connects with a circular strap 40 which works freely around the upper portion of another shaft 42. This latter shaft 42 is constrained to move in a straight line by means of spaced brackets 44 connected to column 16. The brackets 44 are formed with aligned opening through which shaft 42 passes. The arrangement is such that the eccentrically mounted link 38 serves to transmit the rotational motion of pulley 26 into a reciprocating or oscillating motion of shaft 42.

Positioned between brackets 44, and disposed around shaft 42, is a large pulley or wheel 46 which rests against a spacer block 48 positioned between the lower surface of pulley 46 and the lower bracket 44. Pulley 46 is biased against block 48 by a coil spring 50 which fits around shaft 42 and is positioned between the upper surface of pulley 46 and the upper bracket 44.

Shaft 42 and pulley 46 are loosely coupled together so as to permit the shaft to freely reciprocate or oscillate through a central opening in the pulley. However, a mechanical coupling serves to transmit a rotational movement to shaft 42 upon rotational movement of pulley 46. This can be achieved by any one of numerous ways. One such arrangement, for example, is to provide an elongated slot in the shaft extending longitudinally thereof, and to provide a key or tongue projecting radially inwardly of the central opening in the pulley. The shaft and pulley are then disposed so that the key of the pulley is received in the slot of the shaft. It now is evident that whereas the aforesaid coupling does not hinder reciprocal movement of shaft 42 relative to pulley 46, any rotational movement of pulley 46 will impart a similar rotational movement to shaft 42.

Rotational movement of pulley 46 is effected conveniently by the same motor 20 used to drive shaft 22. To this end, a pair of laterally spaced guide rollers 52 are mounted to the rear of the column 16 in the region between brackets 44, and spaced below pulley 32. The rollers 52 are positioned to guide a belt 54 connecting pulley 32 and pulley 46 together. It should now become evident that the same rotation of shaft 28, which causes reciprocal movement of shaft 42 by means of eccentrically mounted link 38, also causes pulley 46 to rotate, which in turn, causes rotational movement of shaft 42. It will further be appreciated that a separate motor can be used to drive pulley 46 in place of the interconnecting pulley and belt arrangement tracing its operation to motor 20.

Figure 3:
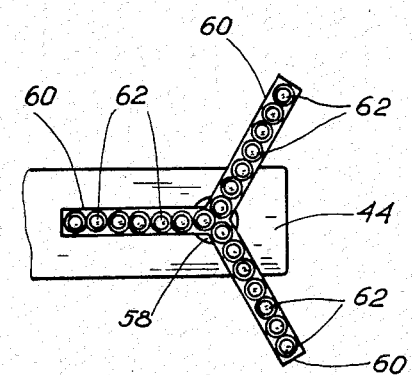
FIG. 3 is a cross sectional view taken along line 3—3 of FIG 1.

Connected to the lower end of shaft 42 is a platen 56. The platen is formed having a collar 58 which fits over the end of shaft 42 and is secured thereto by bolts, or the like. Referring to FIGS. 1 and 3, platen 56 includes three bars 60 joined together in a spoke-like pattern. A plurality of finger-like projections 62 project from the bars for use in processing the pizza dough in a manner hereinafter described.

Supported by and mounted to base 14 is another motor 64 which drives a shaft 66. A cam 68 is fixedly connected to shaft 66 for rotation therewith.

A shaft 70 is positioned in spaced parallel relation to column 16, and in substantial vertical alignment with shaft 42. Shaft 70 is disposed for vertical reciprocal movement through suitable openings provided in a pair of spaced guide brackets 72 mounted to column 16. One end of shaft 70 is provided with a roller or cam follower 74 in operative engagement with cam 68. The operation is such that the energizing of motor 64 serves to impart reciprocal movement to shaft 70 by means of the engagement of cam 68 with cam follower 74.

Figure 4:
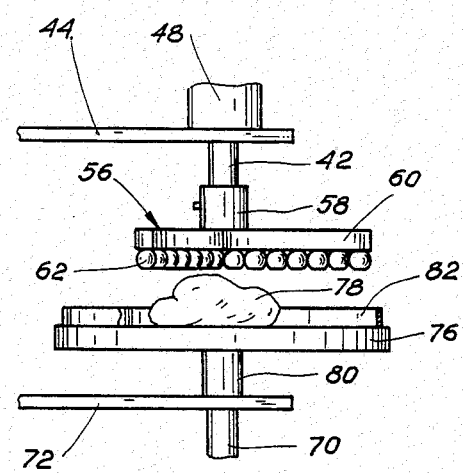
FIG. 4 is a partial side elevational view of the apparatus of FIG. 1 enlarged to show the finger-like projections of the platen bars spaced from the platform support surface, and positioned to operatively come in contact with the dough supported on the platform.

The other end of shaft 70 supports a platform 76 which has an upper surface to support the dough 78 to be processed, as shown in FIG. 4. Platform 76 has a collar 80 which fits over the end of shaft 70. The upper surface of platform 76 has a raised lip 82 to confine the processed dough within a defined boundary. In place of the lip 82, the dough 78 could be placed in a separate pan having its own lip, and the pan supported on platform 76.

Figure 5:
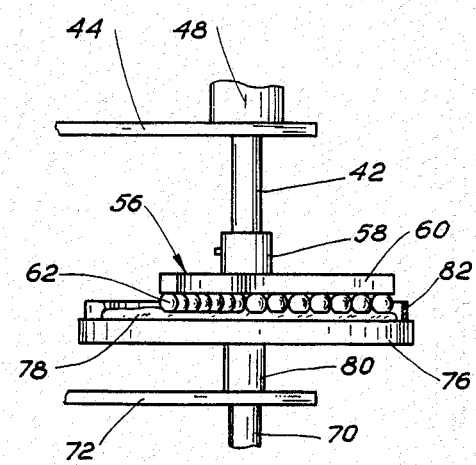
FIG. 5 is a view similar to FIG. 4 showing the projections engaging the dough.
Figure 2:
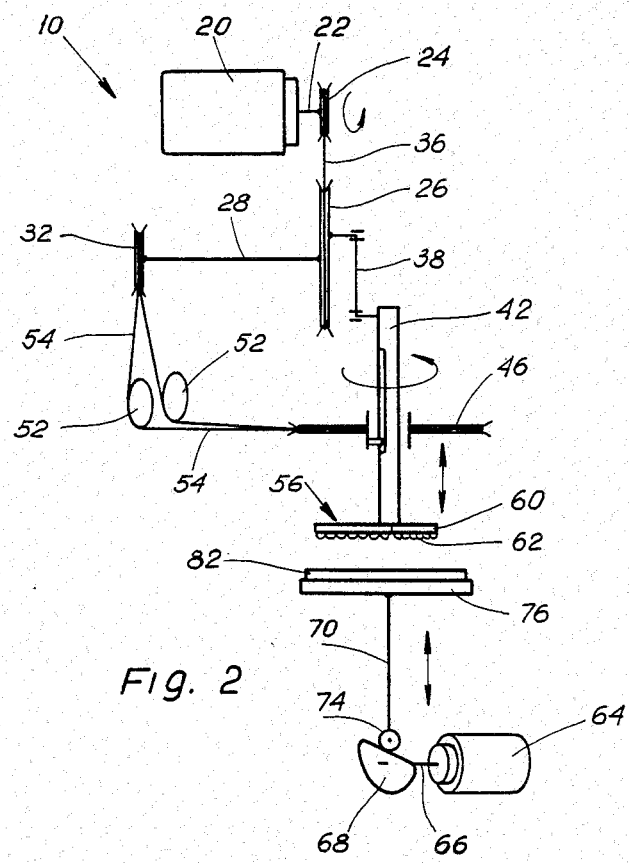
FIG. 2 is a schematic drawing of the apparatus of FIG. 1.

In describing the operation of apparatus 10, reference may be made to FIGS. 1, 4, and 5, and the schematic rendering of FIG. 2. Motors 20 and 64 are energized by an energy source (not shown) conventional in the art. Platen 56 is disposed with its work surface, represented by the finger-like projections 62 of bars 60, spaced from the support surface of platform 76 on which has been placed the pizza dough 78.

As previously indicated, the energizing of motor 20 services to impart to shaft 42 both a reciprocal or oscillatory movement, as well as a rotational movement. In this context, the mechanical linkage which causes the reciprocal movement may be regarded as first motive means whereas the linkage which causes the rotational movement may be regarded as second motive means. The combined oscillatory and rotational movement of shaft 42 causes a corresponding movement in platen 56.

In the apparatus shown, the first and second motive means are coupled to operate simultaneously. However, it is within the purview of the invention that the respective motive means be coupled in such manner that the rotational movement is by indexing in incremental steps rather than operating simultaneously with the reciprocating movement. Regardless of which coupling arrangement is selected, the important feature is that the respective motive means operate in a predetermined timed relationship to one another.

The energizing of motor 64 causes a reciprocal or oscillatory movement to shaft 70 which causes a corresponding movement to platform 76. The movement of platform 76 and platen 56 is such that they oscillate relative to one another along an axis which is perpendicular to the dough support surface. Platform 76 and platen 56 also move rotationally relative to one another in a plane parallel to the dough support surface.

The elevating of platform 76 shortens the stroke required of platen 56 and positions the dough for being processed by the projection 62. The first and second motive means, which are coupled to operate in a predetermined relationship to one another, causes the finger-like projections 62 to engage and process the supported dough, as shown in FIG. 5. The dough is flattened, relaxed and spread within the surface bounded by lip 82. Rotational movement of platen 56 causes the projections 62 to engage different parts of the dough during operation of the apparatus to obtain a substantially uniformly flattened dough. The length of the bars 62 is selected so as to spread the dough 78 on platform 76 and also cause the dough to follow the contour of the lip 82 so that the processed dough will have a raised lip to confine the food ingredients thereon.

The finger-like projections function in a manner resembling the human fingers of a pizza chef. For this purpose, the ends of projections 62 are flattened as shown in FIG. 4.

After the dough 78 is processed, motor 20 is deenergized at a point where platen 56 is in a raised or elevated position, and motor 64 is operated to the point of lowering platform 76 to facilitate removal of the processed dough 78. The dough is now ready to receive whatever ingredients are desired to make the pie, and is placed in an oven for baking.

In place of motor 64 and the co-operative camming arrangement of cam 68 and cam follower 74, the elevating of platform 76 could be done manually by use of a lever bar (not shown) connected to the platform and operated by hand. However, the preferred arrangement is to motorize the entire apparatus for increased speed and efficiency.

The operation as aforesaid is much faster than processing of pizza dough by hand. Whereas it may take a minute or two to process the dough by hand, the invention herein will process an 8 to 10 inch diameter pie in less than 10 seconds.

Although FIG. 3 shows platen 56 formed having three bars 60, it will be appreciated that this number may vary. On could construct the apparatus to have one bar or several bars. In the embodiment shown, the angles between pairs of adjacent bars are substantially equal to one another.

Furthermore, whereas the finger-like projections 62 are shown as lying in a straight line, the arrangement can be varied to locate the projections in a curved or arcuate line.

Figure 6:
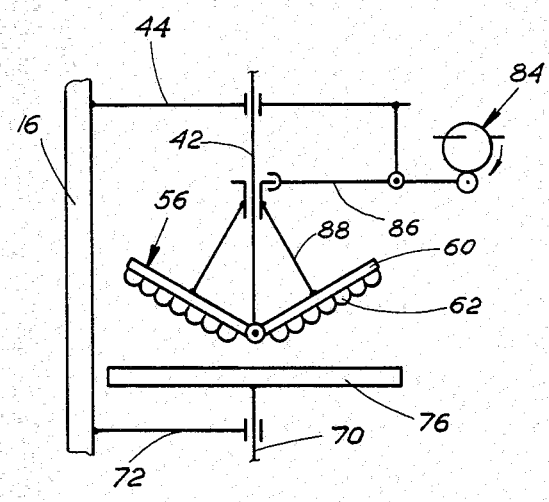
FIGS. 6 and 7 are schematic drawings of another embodiment of the apparatus in which the platen bars are disposed to move in an arcuate path relative to the platform to cause the finger-like projections to engage the dough in a sequential manner.
Figure 7:
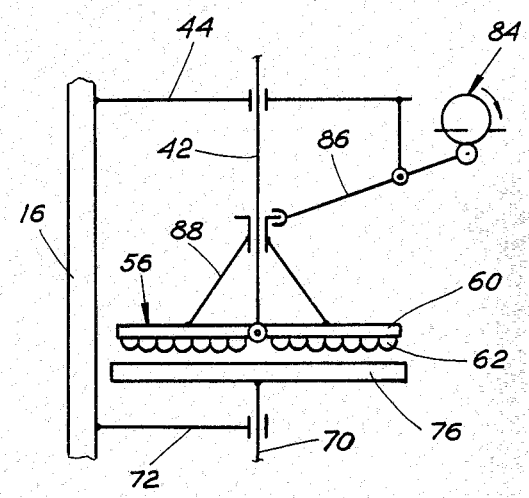

FIGS. 6 and 7 show, in schematic form, another embodiment of the invention in which the platen bars 60 are also disposed to move in a arcuate path relative to platform 76. This motion is in addition to the oscillatory and rotational movement of platen 56 previously described. The mechanical coupling to effect such arcuate motion may come about, for example, by a motor driven camming arrangement represented generally by numeral 84. Such arcuate motion would commence after platen 56 has moved downwardly in position relative to platform 76 to be closely spaced to the dough, whereupon suitable linkage 86 and 88, operated on by motive means 84, causes finger-like projections 62 to engage the dough 78 in a sequential manner. The effect is much like a rolling action from the center of platform 76 outwardly to the perimeter thereof. FIG. 7 shows the position of platen 56 after it has completed travel of its arcuate path.

While the present invention has been described with respect to particular embodiments, it will be readily appreciated and understood that numerous variations and modifications thereof may be made without departing from the spirit or scope of the claimed invention.

I claim:

1. An apparatus to process pizza dough, and the like, said apparatus comprising:
   a platform having a surface to support the dough to be processed;
   a platen having a work surface spaced from said platform;
   a plurality of spaced apart finger-like projections projecting from said work surface and positioned to operatively come in contact with the dough;
   said platform and said platen being movable relative to one another;
   first motive means to cause said platform and said platen to oscillate relative to one another along an axis perpendicular to said dough support surface;
   second motive means to cause said platform and said platen to move relative to one another in a plane parallel to said dough support surface; and
   said first and second motive means coupled to operate in a predetermined timed relationship to one another;
   whereby said projections engage the supported dough during operation of said first and second motive means to process the dough.

2. The apparatus of claim 1, wherein said first and second motive means are coupled to operate simultaneously.

3. The apparatus of claim 1, wherein said platen comprises at least one bar, said finger-like projections projecting from said bar.

4. The apparatus of claim 1, wherein said platen comprises a plurality of bars joined together in a spoke-like pattern, said finger-like projections projecting from said bars.

5. The apparatus of claim 4, wherein the angles between pairs of adjacent bars are substantially equal to one another.

6. The apparatus of claim 1, further comprising third motive means to cause said platform and said platen to move relative to one another in an arcuate path to said dough support surface.

7. The apparatus of claim 6, wherein said platen comprises at least one bar, said finger-like projections projecting from said bar, and said third motive means being operative to cause said projections to engage the supported dough in a sequential manner.

8. The apparatus of claim 1, further comprising a raised lip on said platform support surface to confine the processed dough within the boundary defined by said lip.

9. An apparatus to process pizza dough, and the like, said apparatus comprising:
   a platform having a surface to support the dough to be processed;
   a raised lip on said platform support surface to confine the processed dough within the boundary defined by said lip;
   a platen comprising at least one bar having a work surface spaced from said platform;
   a plurality of spaced apart finger-like projections projecting from said work surface and positioned to operatively come in contact with the dough;
   said platform and said platen being movable relative to one another;
   first motive means to cause said platform and said platen to oscillate relative to one another along an axis perpendicular to said dough support surface;
   second motive means to cause said platform and said platen to move relative to one another in a plane parallel to said dough support surface; and
   said first and second motive means coupled to operate in a predetermined timed relationship to one another;
   whereby said projections engage the supported dough during operation of said first and second motive means to process the dough.

10. The apparatus of claim 9, further comprising third motive means to cause said platform and said platen to move relative to one another in an arcuate path to said dough support surface, said third motive means being operative to cause said projections to engage the supported dough in a sequential manner.

* * * * *